United States Patent
Al-AbdulJabbar et al.

(10) Patent No.: US 11,952,880 B2
(45) Date of Patent: Apr. 9, 2024

(54) METHOD AND SYSTEM FOR RATE OF PENETRATION OPTIMIZATION USING ARTIFICIAL INTELLIGENCE TECHNIQUES

(71) Applicants: SAUDI ARABIAN OIL COMPANY, Dhahran (SA); KING FAHD UNIVERSITY OF PETROLEUM & MINERALS, Dhahran (SA)

(72) Inventors: Ahmad Mohammad Al-AbdulJabbar, Dammam (SA); Salaheldin M. Elkatatny, Dhahran (SA); Abdullah S. Al-Yami, Dhahran (SA)

(73) Assignees: SAUDI ARABIAN OIL COMPANY, Dhahran (SA); KING FAHD UNIVERSITY OF PETROLEUM & MINERALS, Dhahran (SA)

( * ) Notice: Subject to any disclaimer, the term of this patent is extended or adjusted under 35 U.S.C. 154(b) by 459 days.

(21) Appl. No.: 17/213,845

(22) Filed: Mar. 26, 2021

(65) Prior Publication Data
US 2022/0307365 A1    Sep. 29, 2022

(51) Int. Cl.
*E21B 44/00* (2006.01)
*E21B 44/02* (2006.01)
(Continued)

(52) U.S. Cl.
CPC .............. *E21B 44/00* (2013.01); *E21B 44/02* (2013.01); *E21B 45/00* (2013.01); *G06N 20/00* (2019.01); *E21B 2200/22* (2020.05)

(58) Field of Classification Search
None
See application file for complete search history.

(56) References Cited

U.S. PATENT DOCUMENTS 6,490,527 B1 *  12/2002  Utt .......................... G01V 9/00
                                                    702/9
7,020,597 B2 *   3/2006  Oliver ..................... E21B 44/00
                                                    175/45
(Continued)

FOREIGN PATENT DOCUMENTS

CN         101443530 B     12/2012
WO       2020167334 A1      8/2020

OTHER PUBLICATIONS

AbduJabbar et al., "Artificial neural network model for real-time prediction of the rate of penetration while horizontally drilling natural gas-bearing sandstone formations", Arabian Journal of Geosciences, 14:117, Jan. 16, 2021, pp. 1-14 (Year: 2021).*

(Continued)

*Primary Examiner* — Jason Lin
(74) *Attorney, Agent, or Firm* — Osha Bergman Watanabe & Burton LLP (57) ABSTRACT

A method of automatic optimization of ROP. The method obtains a plurality of drilling surface parameters for a field of interest, and determines an UCS data and a MSE data for a targeted formation based on well logs. The method further trains a ML model using the drilling surface parameters as inputs, and outputs a plurality of weights for drilling parameters in a ROP equation and in a Teale's MSE equation for the field of interest. The method further combines the ML ROP equation with the Teale's MSE equation to determine a plurality of optimum drilling parameters by simultaneously solving the set of ML ROP equation and the Teale's MSE equation. Furthermore, the method generates a work order to adjust the drilling parameters and cause display of the work order and the determined optimum drilling parameters in a user interface of a client device.

20 Claims, 6 Drawing Sheets

(51) Int. Cl.
*E21B 45/00* (2006.01)
*G06N 20/00* (2019.01)

(56) References Cited

U.S. PATENT DOCUMENTS

| | | | |
|---|---|---|---|
| 7,261,167 B2 | 8/2007 | Goldman et al. | |
| 7,366,616 B2* | 4/2008 | Bennett | E21B 49/00 |
| | | | 702/9 |
| 7,412,331 B2* | 8/2008 | Calhoun | E21B 44/00 |
| | | | 702/9 |
| 7,555,414 B2 | 6/2009 | Calhoun et al. | |
| 8,245,795 B2* | 8/2012 | Dennis | E21B 47/095 |
| | | | 175/45 |
| 9,249,654 B2 | 2/2016 | Strachan et al. | |
| 9,556,728 B2 | 1/2017 | de Reynal, Jr. | |
| 10,221,671 B1* | 3/2019 | Zhang | G06N 3/084 |
| 10,316,653 B2 | 6/2019 | Coffman et al. | |
| 10,428,638 B2* | 10/2019 | Miller | E21B 44/04 |
| 10,677,052 B2* | 6/2020 | Storm, Jr. | E21B 49/00 |
| 10,697,294 B2 | 6/2020 | Palmer et al. | |
| 11,521,070 B2* | 12/2022 | Tokui | G06N 3/105 |
| 2011/0166837 A1* | 7/2011 | Servaes | G06F 17/10 |
| | | | 703/2 |
| 2011/0220410 A1* | 9/2011 | Aldred | E21B 7/04 |
| | | | 175/26 |
| 2011/0280104 A1* | 11/2011 | McClung, III | E21B 3/022 |
| | | | 175/170 |
| 2014/0110167 A1* | 4/2014 | Goebel | G06N 3/08 |
| | | | 175/24 |
| 2016/0076357 A1* | 3/2016 | Hbaieb | E21B 44/00 |
| | | | 702/9 |

OTHER PUBLICATIONS

Hassan et al., "Coupling rate of penetration and mechanical specific energy to Improve the efficiency of drilling gas wells", Journal of Natural gas science and engineering, 83 (2020) 103558, Aug. 22, 2020, pp. 1-13 (Year: 2020).*

Alali, Ammar M. et al., "Hybrid Data Driven Drilling and Rate of Penetration Optimization", Journal of Petroleum Science & Engineering, Elsevier B.V., 2020, URL: <https://doi.org/10.1016/j.petrol.2020.108075> (52 pages).

Chen, Xuyue et al., "Drilling Performance Optimization Based on Mechanical Specific Energy Technologies", Drilling, Ed. Ariffin Samsuri, IntechOpen, Oct. 2018, pp. 133-161 (29 pages).

Kelessidis, V.C., "Rock drillability prediction from in situ determined unconfined compressive strength of rock", The Journal of the Southern African Institute of Mining and Metallurgy, vol. 11, Jun. 2011, pp. 429-436 (8 pages).

Shi, Xiangchao et al., "Confined compressive strength model of rock for drilling optimization", Petroleum, ScienceDirect, Elsevier B.V., vol. 1, 2015, pp. 40-45 (6 pages).

Talreja, Rahul et al., "Optimizing drilling operation by correlating mechanical specific energy & in-situ rock's compressive strength", IDEC Conference, May 2018 (3 pages).

* cited by examiner

METHOD AND SYSTEM FOR RATE OF PENETRATION OPTIMIZATION USING ARTIFICIAL INTELLIGENCE TECHNIQUES

BACKGROUND

The cost of drilling a well is primarily dependent on the duration of well delivery and complications occurred during drilling. Rate of penetration (ROP) is a useful measure of the speed of a drilling bit breaking the rock under the bit to drill a formation in the borehole. ROP is defined as the volume of rock removed per unit area (ft) per unit time (hr). Accordingly, a fast ROP value is associated with a fast delivery of the well and thus saving time and money. However, excessive ROP may result in hole problems and poor hole cleaning that can extend the duration of well delivery and introduce some complications such as losing part of the bottom hole assembly (BHA) in the hole due to formation instability and collapse, poor hole cleaning and/or downhole vibrations that can cause tool failure. In order to achieve the optimum time of completing of a well, it is necessary to drill at the optimum ROP.

In general, ROP may vary substantially while drilling based on measured conditions (e.g., formation). ROP depends on many hydraulic and mechanical drilling parameters (e.g., torque, revolutions per minute (RPM), weight on bit (WOB), pumping rate (GPM) and stand pipe pressure (SPP), drilling mud rate, etc.). For example, ROP increases with increasing WOB until a certain WOB is reached and then decreases with further WOB. Thus, there is generally a particular WOB that will achieve a maximum ROP for a targeted formation of interest. Drilling conditions (e.g., formation) are complex and dynamic. The determined optimum drilling parameters (e.g., torque and WOB) may be different with the change of the drilling conditions (e.g., formation) over the course of time and/or depth. It is useful to achieve optimum ROP by finding the optimum drilling parameters (e.g., torque, WOB, RPM, GPM, SPP, etc.) while drilling using real-time input data for a particular set of conditions (e.g., formation).

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to obtaining a plurality of drilling surface parameters for a field of interest, and identifies an undefined compressive strength (UCS) data for a targeted formation based on well logs. The method further calculates a mechanical specific energy (MSE) data based on the identified UCS data for the targeted formation of interest, and filters the calculated MSE data based on the identified UCS data with a small range for the targeted formation of interest. The method further trains a machine learning model using the drilling surface parameters as inputs, and outputs a plurality of weights for drilling parameters in a ROP equation derived by using the trained machine learning model for a field of interest, wherein the drilling surface parameters are used as inputs. Furthermore, the method determines a plurality of weights for drilling parameters in a Teale's MSE equation for a field of interest, wherein the drilling surface parameters are used as inputs, and outputs a plurality of weights for drilling parameters in the Teale's MSE equation for a field of interest, wherein the drilling surface parameters are used as inputs. The method further combines the machine learning ROP equation with the Teale's MSE equation to form a set of two equations, and determines a plurality of optimum drilling parameters by simultaneously solving the set of machine learning ROP equation and the Teale's MSE equation. Furthermore, the method generates a work order to adjust the drilling parameters based on the determined optimum drilling parameters and previous drilling parameters, and causes display of the work order and the determined optimum drilling parameters in a user interface of a client device.

In general, in one aspect, embodiments relate to a system including an artificial intelligence (AI) module which includes a plurality of machine learning algorithms and a processor configured to execute instructions stored in a non-transitory computer storage medium for performing a method for optimizing ROP. The system obtains a plurality of drilling surface parameters for a field of interest; and identifies an UCS data for a targeted formation based on well logs. The system further calculates a MSE data based on the identified UCS values for the targeted formation of interest, and filters the calculated MSE data based on the identified UCS data with a small range for the targeted formation of interest. Furthermore, the system trains a machine learning model using the drilling surface parameters as inputs, and outputs a plurality of weights for drilling parameters in a ROP equation derived by using the trained machine learning model for a field of interest, wherein the drilling surface parameters are used as inputs. The system further determines a plurality of weights for drilling parameters in a Teale's MSE equation for a field of interest, wherein the drilling surface parameters are used as inputs, and outputs a plurality of weights for drilling parameters in the Teale's MSE equation for a field of interest, wherein the drilling surface parameters are used as inputs. The system further combines the machine learning ROP equation with the Teale's MSE equation to form a set of two equations, and determines a plurality of optimum drilling parameters by simultaneously solving the set of machine learning ROP equation and the Teale's MSE equation. Furthermore, the system generates a work order to adjust the drilling parameters based on the determined optimum drilling parameters and previous drilling parameters, and causes display of the work order and the determined optimum drilling parameters in a user interface of a client device.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure relate to a system and a method for automatic optimization of ROP during drilling to achieve optimum and efficient drilling using AI techniques such as machine learning (ML) algorithms (e.g., a supervised machine learning (ML) algorithm, a deep learning (DL) algorithm). The ML algorithms are used to relate hydraulic and mechanical drilling parameters to the rate of penetration. Once the model is built using offset well data, it can be used to optimize the drilling rate in new wells using two equations: the AI model, and Mechanical Specific Energy (MSE).

In some example embodiments, the ROP optimization may be performed in a specialized testing apparatus in the lab. In other example embodiments, the ROP optimization may be performed in a specialized testing apparatus downhole during drilling.

ROP is the speed of a drilling bit breaking the rock under the bit to drill a formation in the borehole. ROP is measured by the volume of rock removed per unit area (ft) per unit time (hr). For example, ROP measures the speed or the progress of the drilling bit reported in ft/hr in the field units when the drilling bit drills the formation. In general, ROP may vary substantially while drilling based on measured conditions (e.g., formation) and hydraulic and mechanical drilling parameters (e.g., torque, RPM, WOB, GPM and SPP, drilling mud rate, etc.). For example, ROP may increase in fast drilling formation such as sandstone (positive drill break) and decreases in slow drilling formations such as shale (reverse break) due to diagenesis and overburden stresses. For another example, ROP may increase with an increased value of torque, RPM, and WOB. ROP may decrease with a reduced value of torque, RPM, and WOB. In some example embodiments, a fast ROP may result in a fast delivery of the well by saving time and money. However, a too fast ROP may result in hole problems, poor hole cleaning and/or downhole vibrations that may cause tool failure to extend the duration of well delivery and introduce some complications (e.g., losing part of the BHA in the hole).

Furthermore, Unconfined Compressive Strength (UCS) and MSE are useful measurements of rock hardness to design optimum drilling parameters (e.g., torque, WOB, RPM, GPM, SPP, etc.) in order to increase the life of the drilling operations and reduce flat or non-productive time (NPT) under "efficient drilling" envelope. UCS measures the maximum axial compressive stress that a rock sample may bear under zero confining stress. In general, the optimum (minimum) MSE value may be determined from the UCS value of a targeted formation of interest. MSE measures the total energy applied on the drilling bit divided by the volume removed to drill through a targeted formation of interest. For example, a large MSE suggests more energy is applied to drill through the targeted formation of interest. Alternately, a small MSE value suggests less energy is applied to drill through the formation of interest. Further, MSE may be used to detect drill bit efficiency over time to determine when to change a worn drill bit for a targeted formation of interest.

Furthermore, in one or more embodiments, ROP and MSE may be used to determine optimum drilling parameters (e.g., torque, WOB, RPM, GPM, SPP, etc.) for drill tools (e.g., drill bits, reamers, mills, etc.) for various downhole conditions or other components (e.g., frac plugs, liners, packers, casings, junk, etc.). Embodiments disclosed herein are directed to one or more ML algorithms (e.g., a supervised ML algorithm, a DL algorithm) that may be used to automate the process to assess the optimum ROP and MSE during drilling based on a drilling surface parameters data which include real-time drilling parameters (e.g., torque, WOB, RPM, GPM, SPP, etc.) and downhole data (e.g., UCS and MSE) for a drill bit and provide guidance for drilling parameters optimization during the drilling process, such as adjustment of torque, WOB, RPM, GPM, SPP, drilling mud rate, etc. Real-time data are gathered from actual wells where they represent and capture the true phenomena of the drilling process. Thus they can be used to predict future performance with high confidence.

Figure 1:
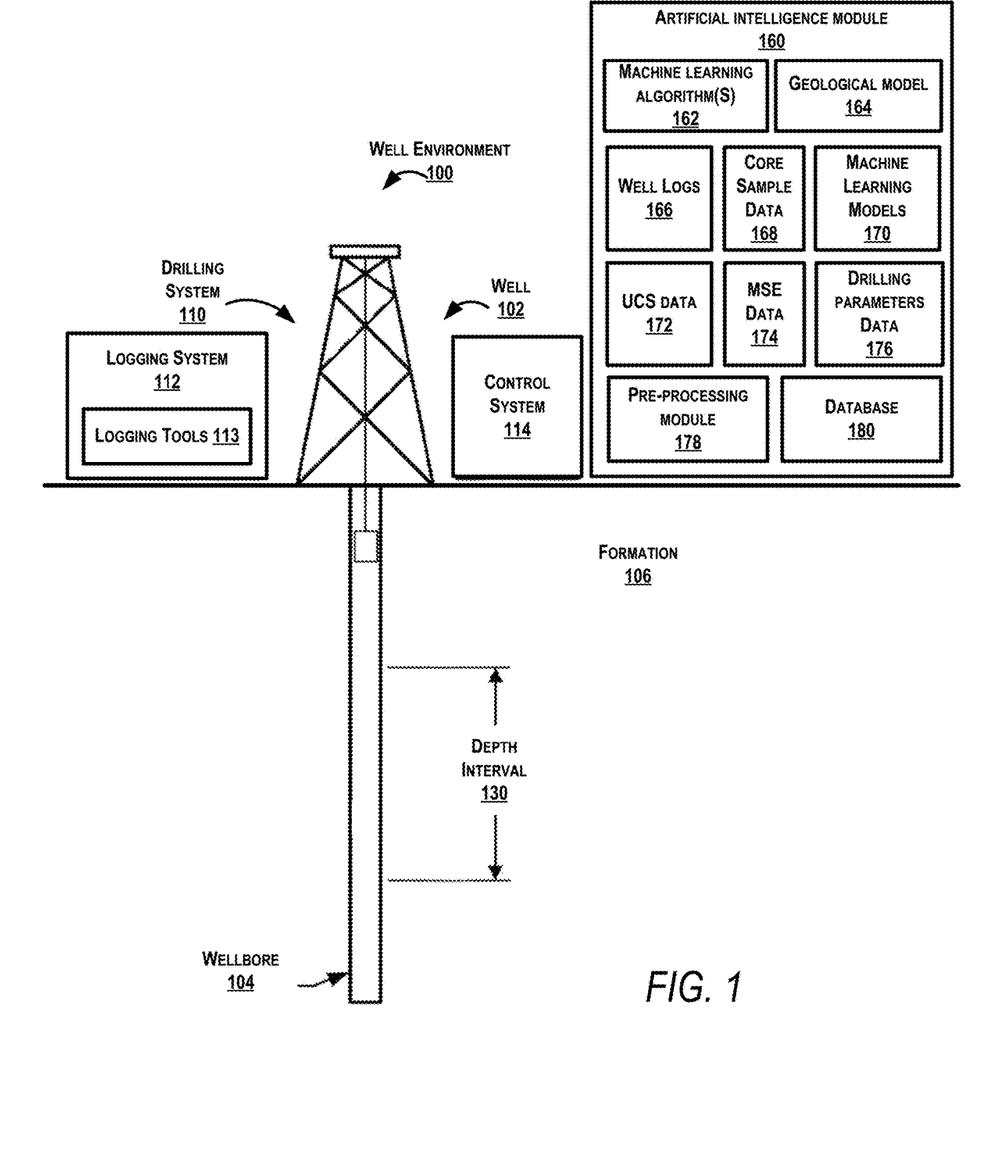
FIG. 1 shows a system in accordance with one or more embodiments.

Turning to FIG. 1, FIG. 1 shows a schematic diagram in accordance with one or more embodiments. FIG. 1 illustrates a well environment (100) that may include a well (102) having a wellbore (104) extending into a formation (106). The wellbore (104) may include a bored hole that extends from the surface into a target zone of the formation (106), such as a reservoir. The formation (106) may include various formation characteristics of interest, such as formation UCS, formation porosity, formation permeability, rock type, unconstrained sonic velocity, stiffness, density, Young's modulus, Poisson's ratio and the like. UCS may indicate the maximum axial compressive stress that a particular rock sample for a formation (106) within the area of interest can bear under zero confining stress. For example, UCS may be indicative of the rock strength for a formation (106) within the area of interest. More specifically, UCS may be determined from other rock properties (e.g., porosity, acoustic velocity, density, Young's modulus, and Poisson's ratio, etc.) measured in a well while drilling. Porosity may indicate how much space exists in a particular rock within an area of interest in the formation (106), where oil, gas, and/or water may be trapped. Unconstrained sonic velocity may indicate the compressional velocity (Vp) and shear velocity (Vs) for a formation (106) within the area of interest. Stiffness may indicate the elasticity for a formation (106) within the area of interest. Permeability may indicate the ability of liquids and gases to flow through the rock within the area of interest. Resistivity may indicate how strongly rock and/or fluid within the formation (106) opposes the flow of electrical current. Water saturation may indicate the fraction of water in a given pore space.

The well environment (100) may include a drilling system (110), a logging system (112), a control system (114), and an artificial intelligence (AI) module (160). The drilling system (110) may include a drill string, a drill bit, a mud circulation system and/or the like for use in boring the wellbore (104) into the formation (106). The control system (114) may include hardware and/or software for managing drilling operations and/or maintenance operations. For example, the control system (114) may include one or more programmable logic controllers (PLCs) that include hardware and/or software with functionality to control one or more processes performed by the drilling system (110). Specifically, a PLC may control valve states, fluid levels, pipe pressures, warning alarms, drilling parameters (e.g., torque, WOB, SPP, RPM, etc.) and/or pressure releases throughout a drilling rig. In particular, a PLC may be a ruggedized computer system with functionality to withstand vibrations, extreme temperatures, wet conditions, and/or dusty conditions, for example, around a drilling rig. Without loss of generality, the term "control system" may refer to a drilling operation control system that is used to operate and control the equipment, a drilling data acquisition and monitoring system that is used to acquire drilling process and equipment data and to monitor the operation of the drilling process, or a drilling interpretation software system that is used to analyze and understand drilling events and progress.

The logging system (112) may include one or more logging tools (113) (e.g., an impulse hammer geomechanical probe, a nuclear magnetic resonance (NMR) spectrometer, a resistivity logging tool, an acoustic transducer, etc.) for use in generating well logs (166), a core sample data (168) and a UCS data (172) of the formation (106). The logging tools (113) provide a powerful way to characterize the fine scale petrophysical properties (e.g., UCS, unconstrained sonic velocities, density, porosity, Young's modulus, stiffness, Poisson's ratio, etc.). For example, the impulse hammer logs measure the reduced Young's modulus by measuring the force-time response at the tip of a small instrumented sensor dropped on a core surface from a specified height and sampling interval. The measurement of reduced Young's modulus may be used to determine other elastic properties for a plurality of core samples (e.g., whole core, slabbed core, viewing slabs, and the ends of small plug samples). More specifically, the impulse hammer logs measure mechanical variations in two dimensions, and measure both elastic stiffness and hardness.

Furthermore, as another example, an NMR logging tool may measure the induced magnetic moment of hydrogen nuclei (e.g., protons) contained within the fluid-filled pore space of porous media (e.g., reservoir rocks). Thus, NMR logs may measure the magnetic response of fluids present in the pore spaces of the reservoir rocks. In so doing, NMR logs may measure both porosity and permeability, as well as the types of fluids present in the pore spaces. Thus, NMR logging may be a subcategory of electromagnetic logging that responds to the presence of hydrogen protons rather than a rock matrix. Because hydrogen protons may occur primarily in pore fluids, NMR logging may directly or indirectly measure the volume, composition, viscosity, and distribution of pore fluids. For another example, an acoustic transducer may measure an acoustic impulse signal periodically generated by a transmitter and picked up by a receiver mounted on a support for movement through the length of the well bore. The transmitter and receiver are spaced apart by a fixed distance and as the support is moved through the well bore. The amplitudes of the received signals are correlated with the depth in the well bore to provide a log indicating the qualities (e.g., acoustic velocity Vp and Vs) of the cement bonding to the bore over the length of the well.

For example, a logging tool (113) may be lowered into the wellbore (104) and/or in the laboratory to acquire measurements (e.g., well logs (166), core sample data (168), and UCS data (172)) as the tool traverses a depth interval (130) (e.g., a targeted reservoir section) of the wellbore (104). The plot of the logging measurements versus depth may be referred to as a "log" or "well log". Well logs (166) may provide depth measurements of the well (102) that describe such reservoir characteristics as formation porosity, formation permeability, resistivity, density, water saturation, total organic content (TOC), volume of kerogen, Young's modulus, Poisson's ratio, and the like. The resulting logging measurements may be stored and/or processed, for example, by the control system (114), to generate corresponding well logs (166) for the well (102). A well log may include, for example, a plot of a logging response time versus true vertical depth (TVD) across the depth interval (130) of the wellbore (104).

Reservoir characteristics may be determined using a variety of different techniques. For example, certain reservoir characteristics can be determined via coring (e.g., physical extraction of rock samples) to produce core samples and/or logging operations (e.g., wireline logging, logging-while-drilling (LWD) and measurement-while-drilling (MWD)). Coring operations may include physically extracting a rock sample from a region of interest within the wellbore (104) for detailed laboratory analysis. For example, when drilling an oil or gas well, a coring bit may cut plugs (or "cores" or "core samples") from the formation (106) and bring the plugs to the surface, and these core samples may be analyzed at the surface (e.g., in a lab) to determine various characteristics of the formation (106) at the location where the sample was obtained.

To determine porosity in the formation (106), various types of logging techniques may be used. For example, the logging system (112) may measure the speed that acoustic waves travel through rocks in the formation (106). This type of logging may generate borehole compensated (BHC) logs, which are also called sonic logs. In general, sound waves may travel faster through high-density shales than through lower-density sandstones. Likewise, density logging may also determine density measurements or porosity measurements by directly measuring the density of the rocks in the formation (106). Furthermore, neutron logging may determine porosity measurements by assuming that the reservoir pore spaces within the formation (106) are filled with either water or oil and then measuring the amount of hydrogen atoms (i.e., neutrons) in the pores. In some embodiments, gamma ray logging is used to measure naturally occurring gamma radiation to characterize rock or sediment regions within a wellbore. In particular, different types of rock may emit different amounts and different spectra of natural gamma radiation. For example, gamma ray logs may distinguish between shales and sandstones/carbonate rocks because radioactive potassium may be common to shales. Likewise, the cation exchange capacity of clay within shales also results in higher absorption of uranium and thorium further increasing the amount of gamma radiation produced by shales.

Furthermore, geosteering may be used to position the drill bit or drill string of the drilling system (110) relative to a boundary between different subsurface layers (e.g., overlying, underlying, and lateral layers of a pay zone) during drilling operations. In particular, measuring rock properties during drilling may provide the drilling system (110) with the ability to steer the drill bit in the direction of desired hydrocarbon concentrations. As such, a geosteering system may use various sensors located inside or adjacent to the drilling string to determine different rock formations within a well path. In some geosteering systems, drilling tools may use resistivity or acoustic measurements to guide the drill bit during horizontal or lateral drilling.

Furthermore, the AI module (160) includes hardware and/or software with functionality to pre-process a UCS data (172) (e.g., a pre-processing module (178)) to detect efficient UCS based on the well logs (166). For example, the pre-processing module (178) identifies a UCS data (172) for a targeted formation (106) of interest based on actual well logs (166) with a small range. For another example, the pre-processing module (178) determines a MSE data (174) based on the identified UCS data (172) for a targeted formation (106) of interest. In some example embodiments, the pre-processing module (178) determines an encoded data set from a MSE data (174) and drilling parameters data (176) (e.g., ROP, torque, RPM, WOB, GPM, SPP, etc.) stored on a database (180).

Furthermore, the AI module (160) includes hardware and/or software with functionality to apply more or more ML algorithms (162) (e.g., a supervised ML algorithm, a DL algorithm) for generating one or more ML models (170) for use in analyzing the formation (106). For example, the AI module (160) may assess the encoded data set (e.g., ROP, torque, RPM, WOB, GPM, SPP, etc.) and partition the encoded data set into a training data set, a validation data set and a testing data set.

Furthermore, the AI module (160) trains a ML model (170) using a ML algorithm (e.g., a supervised ML algorithm, a DL algorithm) based on the training data set to predict a plurality of weights in a model equation (equation 2) based on drilling parameters (e.g., ROP, torque, RPM, WOB, GPM, SPP, drill bit diameter $d_b$) for a targeted formation of interest. In some embodiments, the AI module (160) deploys Teale's MSE equation (equation 1) as another measure of rock properties in absence of other data. Thus, different types of ML models (e.g., convolutional neural networks, deep neural networks, recurrent neural networks, support vector machines, decision trees, inductive learning models, deductive learning models, supervised learning models, etc.) may be trained for a plurality of formations of interest. In some embodiments, the AI module (160) may generate augmented or synthetic data to produce a large amount of interpreted data for training a particular model. Further detail on the ML algorithm is provided below in FIG. 2 and the accompanying description.

$$MSE = \frac{480 \times \text{Torque} \times 1000 \times \text{RPM}}{ROP \times d_b^2} + \frac{1.274 \times WOB \times 1000}{d_b^2} \quad \text{Equation 1}$$

$$ROP = \quad \text{Equation 2}$$
$$(0.3886 \times \text{RPM}) + (5.91 \times \text{Torque}) + (0.0888 \times WOB) - 39.49$$

where MSE is mechanical special energy, torque is a torque applied on the drilling bit, RPM is revolutions per minute, WOB is weight on bit, ROP is rate of penetration, and $d_b$ is the drill bit diameter.

Figure 4A:
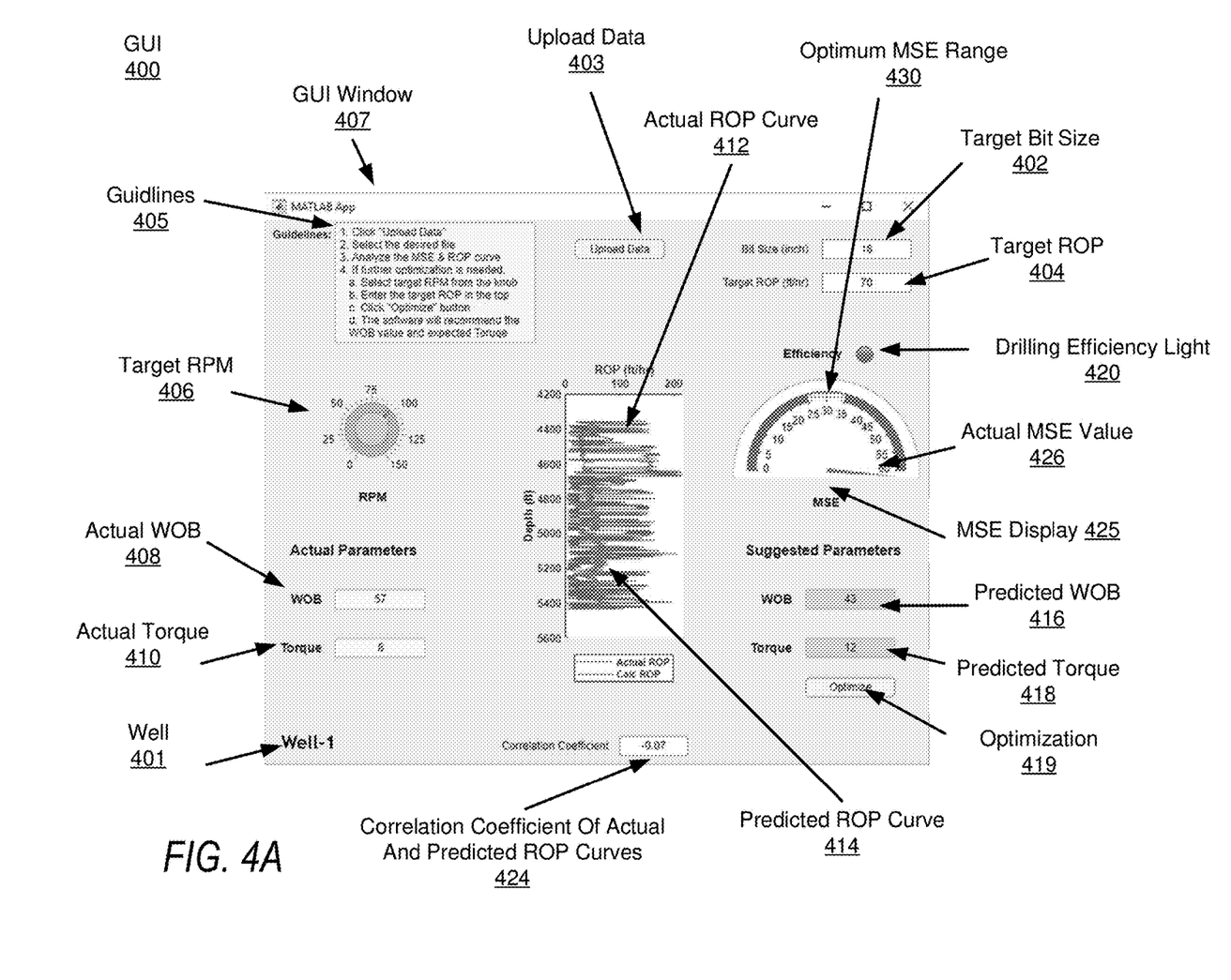
FIGS. 4A and 4B show an example that illustrates operations of ROP optimization, in accordance with one or more embodiments.
Figure 4B:
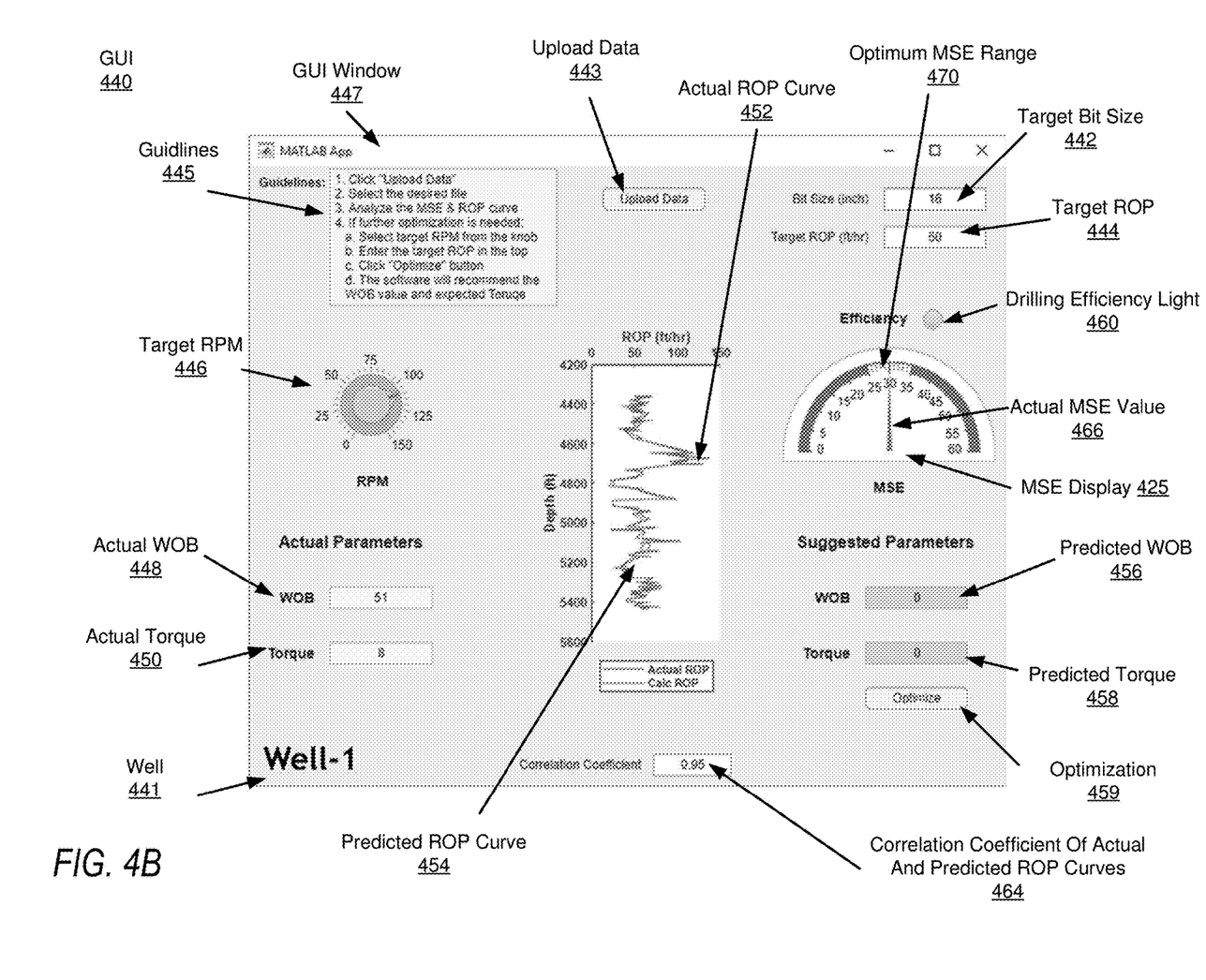

Furthermore, the pre-processing module (178) includes hardware and/or software with functionality to combine the ML ROP equation (equation 2) and the Teale's MSE equation (equation 1) to form a set of two equations (equations 3 and 4) by setting two unknown drilling parameters (e.g., torque and WOB) and other drilling parameters (e.g., MSE, ROP, RPM, and $d_b$) as known or target values. For example, $d_b$ is the input bit diameter in the Graphical User Interface (GUI) software (400, 440). ROP is the set and desired value in the GUI software. RPM is the actual surface RPM value set using the knob in the GUI software. In some example embodiments, the pre-processing module (178) determines the optimum drilling parameters (e.g., torque and WOB) by simultaneously solving the set of two equations (equations 3 and 4). For example, the set of two equations may be formulated in a linear system (equation 5) with a matrix form (equation 6) in which the unknown drilling parameters (e.g., torque and WOB) are determined by solving the inverse of the matrix A. There are many mathematical approaches to solve equation 3 or 4 when there are "two set of equations", or "matrix operation", or others. Because there are two unknowns (Torque & WOB) and two equations (equations 3 and 4), the unknowns can be determined to have unique solutions. In some example embodiments, the AI module (160) sends the determined optimum drilling parameters (e.g., torque and WOB) to the control system (114) to adjust the drilling parameters for efficient drilling the targeted formation of interest. Although only an example embodiment has been described in detail above, those skilled in the art will readily appreciate that many modifications are possible in the example embodiments without materially departing from this invention.

$$MSE = \left(\frac{480 \times 1000 \times \text{RPM}}{ROP \times d_b^2}\right)\text{Torque} + \left(\frac{1.274 \times 1000}{d_b^2}\right)WOB \quad \text{Equation 3}$$

$$ROP - (0.3886 \times \text{RPM}) + 39.49 = \quad \text{Equation 4}$$
$$(5.91 \times \text{Torque}) + (0.0888 \times WOB)$$

$$\begin{bmatrix} \frac{480 \times 1000 \times \text{RPM}}{ROP \times d_b^2} & \frac{1.274 \times 1000}{d_b^2} \\ 5.91 & 0.0888 \end{bmatrix} \quad \text{Equation 5}$$

$$\begin{bmatrix} \text{Torque} \\ WOB \end{bmatrix} = \begin{bmatrix} MSE \\ ROP - (0.3886 \times \text{RPM}) + 39.49 \end{bmatrix}$$
$$Ax = b \quad \text{Equation 6}$$

where MSE is mechanical special energy, torque is a torque applied on the drilling bit, RPM is revolutions per minute, WOB is weight on bit, ROP is rate of penetration, $d_b$ is the drill bit diameter, A is $$\begin{bmatrix} \frac{480 \times 1000 \times \text{RPM}}{ROP \times d_b^2} & \frac{1.274 \times 1000}{d_b^2} \\ 5.91 & 0.0888 \end{bmatrix},$$

x is $$\begin{bmatrix} \text{Torque} \\ WOB \end{bmatrix},$$

b is $$\begin{bmatrix} MSE \\ ROP - (0.3886 \times \text{RPM}) + 39.49 \end{bmatrix}.$$

Keeping with FIG. 1, a well path of a wellbore (104) may be updated by the control system (114) using a geological model (e.g., one of the geological models (164)). For example, a control system (114) may communicate geosteering commands to the drilling system (110) based on well data updates that are further adjusted by the AI module (160) using a geological model (164). As such, the control system (114) may generate one or more control signals for drilling equipment based on an updated well path design and/or a geological model. In some embodiments, the AI module (160) determines one or more formation top depths from seismic data and/or well log data. The AI module (160) may use these formation top depths to adjust the well path of the wellbore (104) accordingly.

Figure 2:
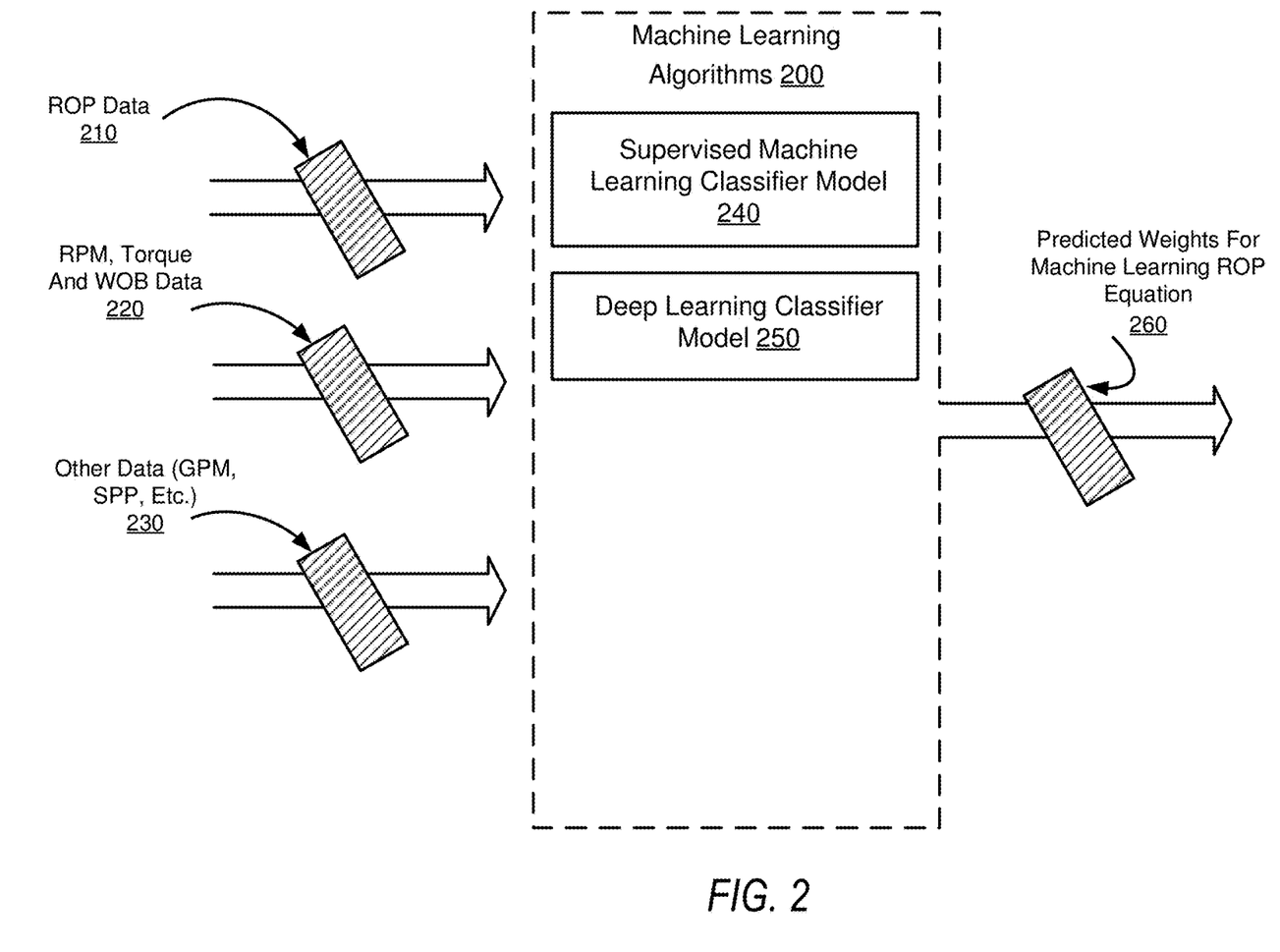
FIG. 2 shows an AI system, in accordance with one or more embodiments.

FIG. 2 shows an example of generating a model to determine a plurality of weights in the ROP equation based on a plurality of drilling parameters (e.g., ROP, torque, RPM, WOB, GPM, SPP, and $d_b$) in accordance with one or more embodiments. The following example is for explanatory purposes only and not intended to limit the scope of the disclosed technology.

In some embodiments, the AI module (160) may use a simple data split technique to separate the encoded data set (e.g., ROP, torque, RPM, WOB, GPM, SPP, and $d_b$) used for the training, validation, and testing of the ML models. An example of the data split technique considers 70% of the encoded data set for model training (e.g., tuning of the model parameters), 10% of the encoded data set for validation (e.g., performance validation for each different set of model parameters), and 20% of the encoded data set for testing the final trained model. However, the data split technique may result in the over-fitting problem of the ML models with limited generalization capabilities. For example, the deployed model will underperform when predicting unseen samples. Although only example embodiments have been described in detail above, those skilled in the art will readily appreciate that many modifications are possible in the example embodiments without materially departing from this invention.

In FIG. 2, a ML model (e.g., a supervised ML classifier model (240), a DL classifier model (250)) is trained using one or more ML algorithms (200) (e.g., a supervised ML algorithm and/or a DL neural network). In particular, the ML model (e.g., a supervised ML classifier model (491), a DL classifier model (492)) obtains an encoded training data set (e.g., a ROP data (210), a RPM, torque, and WOB data (220), and other data (e.g., GPM, SPP) (230)). In some example embodiments, different ML or DL algorithms (e.g., a linear regression algorithm, a logistic regression algorithm, a support vector regression algorithm, a random forest algorithm, a boosted decision tree algorithm, a multi-layer perceptron algorithm, a convolutional neural network, etc.) may be used to perform the classification problem to determine the predicted weights for ML ROP equation (260).

In some example embodiments, the AI module (160) applies a nested k-fold inner/outer cross-validation to tune and validate the optimal parameters of the ML model. In one or more embodiments, the nested stratified inner/outer cross-validation may be a software and hardware system which includes functionality to mitigate the over-fitting problem of the ML model by applying a k-fold inner cross-validation and a k-fold outer cross-validation. The k-fold inner cross-validation and the k-fold outer cross-validation may have different values of the "k" parameter. In some example embodiments, the nested inner/outer cross-validation defines a plurality of supervised ML algorithms and their corresponding models in a grid and evaluates a performance metrics of interest (e.g., area under curve (AUC), accuracy, geometric mean, f1 score, mean absolute error, mean squared error, sensitivity, specificity, etc.) to find the optimal parameters of the ML model.

While FIGS. 1 and 2 show various configurations of components, other configurations may be used without departing from the scope of the disclosure. For example, various components in FIGS. 1 and 2 may be combined to create a single component. As another example, the functionality performed by a single component may be performed by two or more components.

Figure 3:
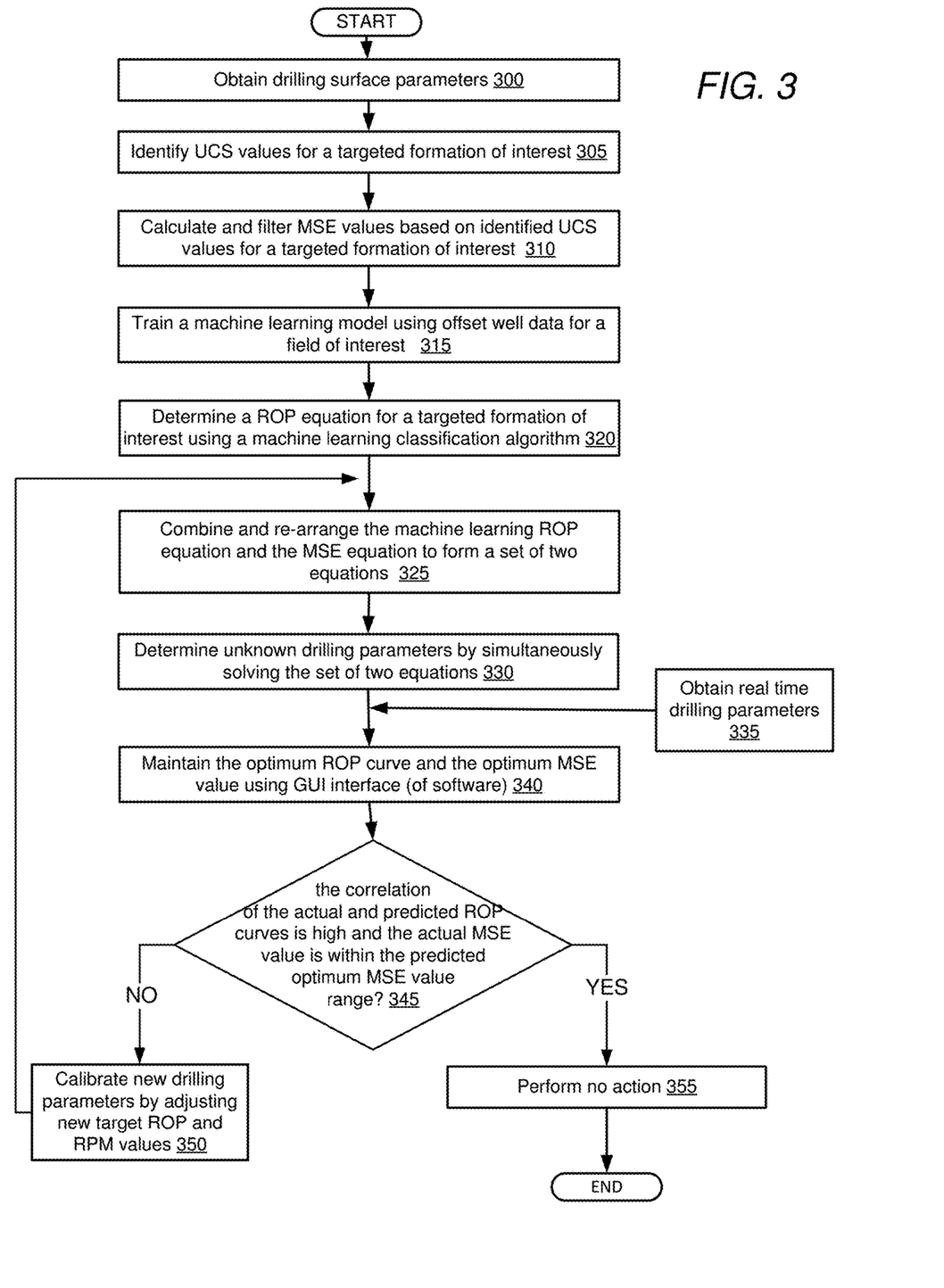
FIG. 3 shows a flowchart, in accordance with one or more embodiments.

FIG. 3 shows a flowchart in accordance with one or more embodiments. Specifically, FIG. 3 describes a general workflow to determine the optimum drilling parameters (e.g., torque and WOB) for a targeted formation of interest based on well logs and/or offset well data by simultaneously solving the ML ROP equation and the Teale's MSE equation. One or more blocks in FIG. 3 may be performed by one or more components (e.g., logging system (110), AI module (160), and control system (114)) as described in FIG. 1. While the various blocks in FIG. 3 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 300, a plurality of drilling data (e.g., well logs (162), core sample data (168), UCS data (172), drilling parameters data (176), etc.) are received during drilling in accordance with one or more embodiments. For example, the drilling parameters data (ROP, torque, RPM, WOB, GPM, SPP, etc.) are obtained upon a request to evaluate the optimum ROP and MSE for drilling a well (102) through a targeted formation (106) of interest by the control system (114).

In Block 305, UCS data (172) is identified for a targeted formation (106) of interest based on well logs (162) in accordance with one or more embodiments. For example, the UCS data (172) may be determined by using one or more ML algorithms (e.g., a fuzzy clustering algorithm, a DL algorithm, etc.) which provide synthetic acoustic velocities at the position of the bit without requiring conventional acoustic logging tool sources and sensors to acquire acoustic velocity measurements in the target wellbore. In another example, the UCS data (172) may be determined by using an empirical statistical multi-linear model with a plurality of well log inputs (e.g., acoustic velocity, density, porosity, Young's modulus, and Poisson's ratio, etc.) derived for a particular rock sample.

In Block 310, MSE data (174) is determined to match the UCS data (172) with a small range for a targeted formation of interest in accordance with one or more embodiments. For example, the AI module (160) may apply range criteria to the UCS data (172) and the MSE data (174) to remove out-of-range samples, after removing missing or Not a Number (NaN) data entries. The AI module (160) may apply various statistical outlier detection algorithms to remove outlier samples given that all these measurements are for physical quantities with expected efficient value ranges. In one or more embodiments, the optimum MSE is of the same magnitude of the UCS for a targeted formation of interest. For example, the optimum MSE may be determined by the UCS divided by the efficiency of transmitting the penetration power of the drilling rig to the rock sample which may be estimated from existing data.

In Block 315, a ML model is trained using a ML algorithm (e.g., a supervised ML algorithm, a DL algorithm) based on the encoded training data set of drilling surface parameters (e.g., ROP, torque, RPM, WOB, GPM, SPP, etc.) in accordance with one or more embodiments. The ML model is applied to predict a ROP using as one or more input drilling parameters (e.g., torque, RPM, WOB, GPM, SPP, etc.). Different ML algorithms (e.g., an artificial neural network, a linear regression algorithm, a logistic regression algorithm, a support vector regression algorithm, a random forest algorithm, a boosted decision tree algorithm, a multi-layer perceptron algorithm, a convolutional neural network, etc.) may be used to perform the classification problem. The AI module (160) determines and validates optimal parameters of the ML model in accordance with one or more embodiments. A nested k-fold cross-validation technique is used to train and tune the ML/DL model parameters. For example, the inner k-fold cross-validation is used to tune the ML model parameters performed on the encoded training data set. The outer k-fold cross-validation is used to validate the final performance of the ML model on the encoded testing data set.

In Block 315, the ML model is applied, by the AI module (160), to determine a plurality of weights for drilling parameters (e.g., ROP, torque, RPM, WOB, GPM, SPP, etc.) in the ML ROP equation. For example, the ML ROP equation (equations 2 and 4) have a value of "1" for ROP, a value of "0.3886" for RPM, a value of "5.91" for torque, a value of "0.0888" for WOB, a constant value of "−39.49" and a value of "0" for other input drilling parameters (e.g., GPM and SPP, etc.).

In Block 325, the ML ROP equation and the Teale's MSE equation are combined to form a set of two equations (equations 3 and 4) in accordance with one or more embodiments. In some example embodiments, the formed set of two equations may be described in a linear matrix form equation (equations 5 and 6) with two unknown drilling parameters (e.g., torque and WOB) and other drilling parameters (e.g., ROP, MSE, RPM, GPM, SPP, etc.) set as targets. For example, the MSE may be set as "30000" psi if the targeted MSE is in the range of 25000 psi-35000 psi. The ROP may be set as "70" ft/hr. RPM may be set as "100".

In Block 330, two unknown drilling parameters (e.g., torque and WOB) are determined by simultaneously solving the set of two equations (e.g., equations 5 and 6) in accordance with one or more embodiments. In some example embodiments, the determined drilling parameters (e.g., torque and WOB) predict the optimum ROP and MSE to enhance drilling rate under the "efficient drilling" envelope and prevent BHA and bit damage or wasting energy. For example, the AI module (160) may determine two unknown drilling parameters (e.g., torque and WOB) by solving the inverse of a matrix A (equation 6) in which ROP and RPM are used as known targeted inputs. For another example, the AI module (160) may determine two unknown drilling parameters (e.g., ROP and RPM) by solving the inverse of a different matrix A' (equation 6) in which torque and WOB are used as known targeted inputs. Although only an example embodiment has been described in detail above, those skilled in the art will readily appreciate that many modifications are possible in the example embodiments without materially departing from this invention.

In Block 335, real-time drilling parameters (e.g., ROP, torque, RPM, WOB, GPM, SPP, etc.) are obtained during drilling in accordance with one or more embodiments. For example, the geological model (164) describes a lithology distribution which provides the percentage of each lithofacies along depth in each well. For another example, the well (102) has a similar lithology distribution in space within the area of interest for certain field where the ML model is trained using offset well data.

In Block 340, an optimum ROP curve and an optimum MSE for the real-time drilling parameters (e.g., torque, RPM, WOB, GPM, SPP, etc.) are maintained during drilling. ROP is maintained by setting a targeted value, so the calculated torque and WOB will ensure achieving the targeted ROP. MSE can be monitored on range to ensure it is within the optimum UCS range. If the MSE value went beyond the optimum value, some real-time optimum drilling parameters (e.g., torque and WOB) are predicted by simultaneously solving the ML ROP equation (equation 4) and the Teale's MSE equation (equation 3) based on the current surface RPM and targeted ROP.

In Block 345, a correlation coefficient between the predicted optimum ROP curve and the actual ROP curve based on the predicted optimum drilling parameters (e.g., torque and WOB) is determined for a targeted formation of interest during drilling in accordance with one or more embodiments. In some example embodiments, the AI module (160) determines drilling efficiency by comparing the actual MSE to the predicted optimum MSE for a targeted formation of interest. For example, the AI module (160) determines an "inefficient" drilling type if the correlation coefficient is low (e.g., a value of "−0.07") between the predicted optimum ROP curve and the actual ROP curve for a targeted formation of interest during drilling and the actual MSE (e.g., a value of "65000" psi) is outside the target efficient MSE (e.g., a range of 25000-35000 psi).

In other embodiments, the AI module (160) determines an "efficient" drilling type if the correlation coefficient is low (e.g., a value of "0.95") between the predicted optimum ROP curve and the actual ROP curve for a targeted formation of interest during drilling and the actual MSE (e.g., a value of "30000" psi) is within the targeted MSE (e.g., a range of 25000-35000 psi). This correlation may be performed by one of many methods well known to one of ordinary skill in the art. For example, the correlation coefficient may be a Pearson correlation coefficient, an intraclass correlation coefficient, a rank correlation coefficient, and a polychoric correlation coefficient, etc. Further details on the correlation coefficient between the predicted optimum ROP/MSE and the actual ROP/MSE for a targeted formation of interest during drilling is provided below in FIG. 4.

In Block 350, new drilling parameters (e.g., ROP and RPM) are calibrated against new targeted values when the drilling is determined as an "inefficient" drilling type in accordance with one or more embodiments. In one or more embodiments, in response to determining an "inefficient" drilling type, a command is transmitted to the AI module (160) to update a plurality of weights in the ML ROP equation in Block 325 based on the calibrated new targeted drilling parameters (e.g., ROP and RPM). For example, the ROP may be set as "60" ft/hr. RPM may be set as "110". In one or more embodiments, the AI module (160) re-arranges the set of ML ROP equation (equation 4) and Teale's MSE equation (equation 3) based on the updated drilling parameters (e.g., ROP and RPM). In one or more embodiments, the AI module (160) determines optimum drilling parameters (e.g., torque and WOB) based on the re-arranged set of ML ROP equation (equation 4) and Teale's MSE equation (equation 3).

In Block 355, no action is undertaken when the drilling is determined as an "efficient" drilling type in accordance with one or more embodiments, and the process ends. In some example embodiments, a work order is generated that the final optimum drilling parameters are transferred to the control system (114) and displayed on a user device.

The procedure to identify a real-time UCS data from well logs and calculate a real-time MSE data based on the identified UCS data for a targeted formation of interest may be automated. For example, the AI module (160) may automate the process to combine and re-arrange the ML ROP equation (equation 4) and Teale's MSE equation (equation 3) and simultaneously solving these two equations to achieving optimum drilling parameters (e.g., torque and WOB) based on targeted drilling parameters (e.g., RPM, GPM, SPP, etc.) during drilling. The automated process may be used to determine an "efficient" or "inefficient" drilling type from the correlation coefficient of predicted optimum ROP curve and an actual ROP curve and from the comparison of the predicted optimum MSE and an actual MSE.

FIG. 4A shows an example of a GUI (400) that exhibits "inefficient" drilling for a well (e.g., well-1 (401)). The GUI (400) is part of a software application that interacts with a user via a graphical display. The GUI (400) receives input from the user through different modes of access, such as a mouse and pointer combination, or through a keyboard. A visual output of a GUI (400) is typically displayed on a display device, such as a computer monitor screen, and includes widgets that allow the user to interact with the GUI (400). Examples of widgets include windows, captions, buttons, labels, menu bars, toolbars, dialog boxes, menus, icons, etc. An example of a GUI (400) visual output is a window (407) as shown in FIG. 4A. In this example, there are a Bit Size (inch) dialog box (402), an Upload Data button (403), a Target ROP (ft/hr) dialog box (404), a Guidelines dialog box (405), a target RPM dialog box (406), an actual WOB dialog box (408), an actual Torque dialog box (410), an actual ROP Curve dialog box (412), a Predicted ROP Curve dialog box (414), a Predicted WOB dialog box (416), a Predicted Torque dialog box (418), a Optimize button (419), a Drilling Efficiency Light (420), a Correlation Coefficient of Actual and Predicted ROP Curves dialog box (424), a MSE Display dialog box (425), an actual MSE value dialog box (426), as indicated by appropriate labels. Widgets may also represent software applications that may be executed by the user, such as a Web Browser widget, which represents a Web Browser application, or a pointer icon, which represents the position of a mouse.

When the user interacts with the GUI (400) by, for example, clicking the mouse while the pointer is positioned above a widget, a message is sent from the mouse to the GUI (400). For another example, when the user interacts with the GUI (400) by choosing a value in a dialog box in the widget, a message is sent from the dialog box to the GUI (400). The message is a signal transmitted by a computer on which the GUI (400) is executing, and is directed to and accesses the widget. The message may be relayed from the mouse to the GUI (400) by means of a system tool such as an operating system (or other intermediary software application, such as a windowing toolkit) that manages the computer system or graphical display on which the GUI (400) operates. The computer system applies the AI module (160) to optimize ROP based on received data from GUI (400). The GUI (400) interprets the message and determines whether to take action based on the position of the pointer when the mouse was clicked.

Referring to FIG. 4A, if the user clicks on the Guidelines dialog box (405), a message is sent from the mouse to the GUI (400), accessing the Guidelines dialog box (405) item. The GUI (400) receives the message, interprets the message and determines that the user wants the Guidelines dialog box (405) to be expanded. The GUI (400) then alters the screen image to reflect the expansion of the Guidelines dialog box (405). In this example, the expanded Guidelines dialog box (405) shows the process to optimize the ROP. The user clicks the Upload Data button (403) to choose the well data (e.g., UCS and MSE) during drilling for analysis in Blocks 300, 305, 310 of FIG. 3. Then the user chooses a plurality of targeted drilling parameters (e.g., target bit size (402), target ROP (404), target RPM (406)) in Block 300 of FIG. 3 which may be determined from previous knowledge. For example, the targeted drilling parameters include a bit size of "16" inch, a target ROP of "70" ft/hr, a target RPM of "100". when the user clicks the Optimize button (419), a message is sent from the mouse to the GUI (400) to start to train a ML model using the obtained drilling surface parameters (e.g., UCS, MSE, bit size, ROP, RPM) in Blocks 315, 320, 325 of FIG. 3 and predict the unknown drilling parameters (e.g., torque (418) and WOB (416)) by simultaneously solving the ML ROP equation and the Teale's MSE in Block 330 of FIG. 3 based on the targeted drilling parameters (e.g., target bit size (402), target ROP (404), target RPM (406)) as inputs for the targeted formation of interest. The optimum ROP curve (414) and the optimum MSE (430) are predicted to be within a target efficient MSE (e.g., a range of 25000-35000 psi). The actual torque (410) and the actual WOB (408) are indicated for comparison.

Furthermore, an actual ROP curve (412) and an actual MSE (426) of about "65000" psi are obtained during drilling in Block 340 of FIG. 3 based on the obtained real-time drilling parameters in Block 335 of FIG. 3. More specifically, an "inefficient" drilling type is determined in Block 345 of FIG. 3 as indicated by a drilling efficiency light (420) when the correlation coefficient of the actual and predicted ROP (424) has a value of "−0.07" and the actual MSE (426) (e.g., a value of about "65000" psi) is outside the targeted efficient MSE (e.g., a range of 25000-35000 psi) (430). In response to determining an "inefficient" drilling type, a command is transmitted to the AI module (160) to update a plurality of weights in the ML ROP equation in Block 325 of FIG. 3 based on the calibrated new targeted drilling parameters (e.g., target ROP (404), target RPM (406)) in Block 350 of FIG. 3. For example, the ROP may be set as "60" ft/hr. RPM may be set as "110". The drilling efficiency light (420) may have various methods to indicate the drilling is an "efficient" type or an "inefficient" type. For example, the drilling efficiency light (420) may show a green color when the correlation coefficient of the actual and predicted ROP (424) has a value above a threshold value (e.g., a value of "0.8") and/or the actual MSE (426) (e.g., a value of about "35000" psi) is within the targeted efficient MSE (e.g., a range of 25000-35000 psi) (430). In another example, the drilling efficiency light (420) may show a red color when the correlation coefficient of the actual and predicted ROP (424) has a value below a threshold value (e.g., a value of "0.2") and/or the actual MSE (426) (e.g., a value of about "65000" psi) is outside the targeted efficient MSE (e.g., a range of 25000-35000 psi) (430). Although only example embodiments of a GUI for interfacing with a user have been described in detail above, those skilled in the art will readily appreciate that many modifications are possible in the example embodiments without materially departing from this invention.

FIG. 4B shows a GUI (440) example of "efficient" drilling for a well (e.g., well-1 (441)). An example of a GUI (440) visual output is a window (447) as shown in FIG. 4B. In this example, there are a Bit Size (inch) dialog box (442), an Upload Data button (443), a Target ROP (ft/hr) dialog box (444), a Guidelines dialog box (445), a target RPM dialog box (446), an actual WOB dialog box (448), an actual Torque dialog box (450), an actual ROP Curve dialog box (452), a Predicted ROP Curve dialog box (454), a Predicted WOB dialog box (456), a Predicted Torque dialog box (458), a Optimize button (459), a Drilling Efficiency Light (460), a Correlation Coefficient of Actual and Predicted ROP Curves dialog box (464), a MSE Display dialog box (465), an actual MSE value dialog box (466), as indicated by appropriate labels. Widgets may also represent software applications that may be executed by the user, such as a Web Browser widget, which represents a Web Browser application, or a pointer icon, which represents the position of a mouse.

Referring to FIG. 4B, if the user clicks on the Guidelines dialog box (445), a message is sent from the mouse to the GUI (440), accessing the Guidelines dialog box (445) item. The GUI (440) receives the message, interprets the message and determines that the user wants the Guidelines dialog box (445) to be expanded. The GUI (440) then alters the screen image to reflect the expansion of the Guidelines dialog box (445). In this example, the expanded Guidelines dialog box (445) shows the process to optimize the ROP. The user clicks the Upload Data button (443) to choose the well data (e.g., UCS and MSE) during drilling for analysis in Blocks 300, 305, 310 of FIG. 3. Then the user chooses a plurality of targeted drilling parameters (e.g., target bit size (442), target ROP (444), target RPM (446)) in Block 300 of FIG. 3 which may be determined from previous knowledge. For example, the targeted drilling parameters include a bit size of "16" inch, a target ROP of "60" ft/hr, a target RPM of "110". When the user clicks the Optimize button (459), a message is sent from the mouse to the GUI (440) to start to train a ML model using the obtained drilling surface parameters (e.g., UCS, MSE, bit size, ROP, RPM) in Blocks 315, 320, 325 of FIG. 3 and predict the unknown drilling parameters (e.g., torque (458) and WOB (456)) by simultaneously solving the ML ROP equation and the Teale's MSE in Block 330 of FIG. 3 based on the targeted drilling parameters (e.g., target bit size (442), target ROP (444), target RPM (446)) as inputs for the targeted formation of interest. The optimum ROP curve (454) and the optimum MSE (470) are predicted to be within a target efficient MSE (e.g., a range of 25000-35000 psi). The actual torque (450) and the actual WOB (448) are indicated for comparison.

Furthermore, an actual ROP curve (412) and an actual MSE (426) of about "30000" psi are obtained during drilling in Block 340 of FIG. 3 based on the obtained real-time drilling parameters in Block 335 of FIG. 3. More specifically, an "efficient" drilling type is determined in Block 345 of FIG. 3 as indicated by a drilling efficiency light (460) when the correlation coefficient of the actual and predicted ROP (424) has a value of "0.95" and the actual MSE (466) (e.g., a value of about "30000" psi) is within the targeted efficient MSE (e.g., a range of 25000-35000 psi) (470). In response to determining an "efficient" drilling type, no further action is performed in Block 355 of FIG. 3. A command is transmitted to the AI module (160) to generate a work order that the final optimum drilling parameters are transferred to the control system (114) and displayed on a user device. The drilling efficiency light (460) may have various methods to indicate the drilling is an "efficient" type or an "inefficient" type. For example, the drilling efficiency light (460) may show a green color when the correlation coefficient of the actual and predicted ROP (464) has a value above a threshold value (e.g., a value of "0.8") and/or the actual MSE (466) (e.g., a value of about "35000" psi) is within the targeted efficient MSE (e.g., a range of 25000-35000 psi) (470). For another example, the drilling efficiency light (460) may show a red color when the correlation coefficient of the actual and predicted ROP (464) has a value below a threshold value (e.g., a value of "0.2") and/or the actual MSE (466) (e.g., a value of about "65000" psi) is outside the targeted efficient MSE (e.g., a range of 25000-35000 psi) (470).

Figure 5:
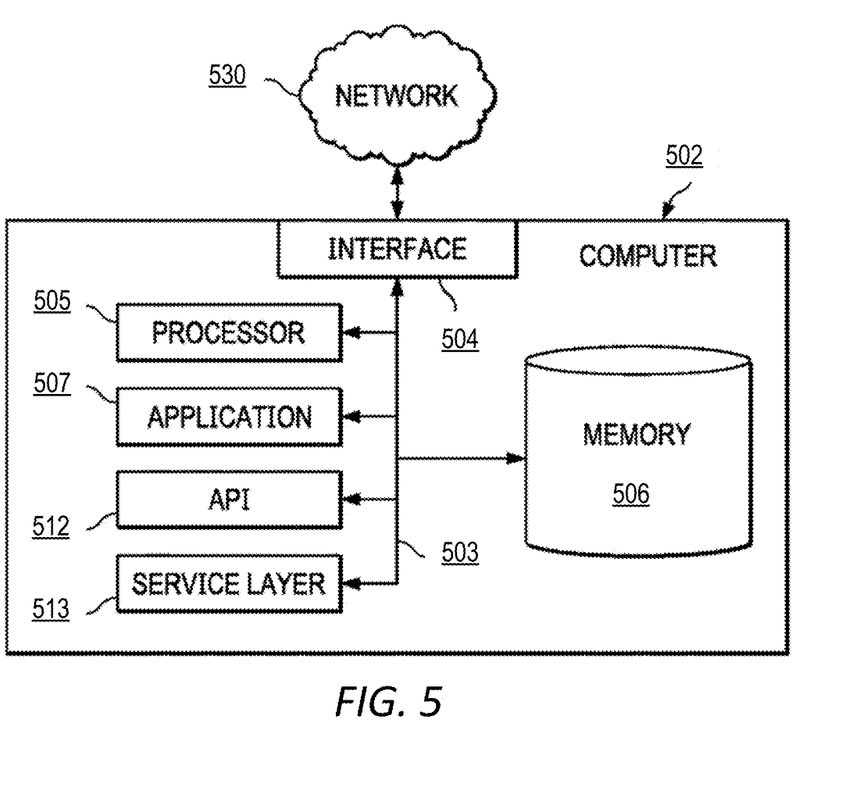
FIG. 5 shows a computer system, in accordance with one or more embodiments.

Embodiments disclosed herein may be implemented on a computer system. FIG. 5 is a block diagram of a computer system (502) used to provide computational functionalities associated with described algorithms, methods, functions, processes, flows, and procedures as described in the instant disclosure, according to an implementation. The illustrated computer (502) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (502) may include an input device, such as a keypad, keyboard, touch screen, or other device that can accept user information, and an output device that conveys information associated with the operation of the computer (502), including digital data, visual, or audio information (or a combination of information), or a GUI.

The computer (502) can serve in a role as a client, network component, a server, a database or other persistency, or any other component (or a combination of roles) of a computer system for performing the subject matter described in the instant disclosure. The illustrated computer (502) is communicably coupled with a network (530). In some implementations, one or more components of the computer (502) may be configured to operate within environments, including cloud-computing-based, local, global, or other environment (or a combination of environments).

At a high level, the computer (502) is an electronic computing device operable to receive, transmit, process, store, or manage data and information associated with the described subject matter. According to some implementations, the computer (502) may also include or be communicably coupled with an application server, e-mail server, web server, caching server, streaming data server, business intelligence (BI) server, or other server (or a combination of servers).

The computer (502) can receive requests over network (530) from a client application (for example, executing on another computer (502)) and responding to the received requests by processing the said requests in an appropriate software application. In addition, requests may also be sent to the computer (502) from internal users (for example, from a command console or by other appropriate access method), external or third-parties, other automated applications, as well as any other appropriate entities, individuals, systems, or computers.

Each of the components of the computer (502) can communicate using a system bus (503). In some implementations, any or all of the components of the computer (502), both hardware or software (or a combination of hardware and software), may interface with each other or the interface (504) (or a combination of both) over the system bus (503) using an application programming interface (API) (512) or a service layer (513) (or a combination of the API (512) and service layer (513). The API (512) may include specifications for routines, data structures, and object classes. The API (512) may be either computer-language independent or dependent and refer to a complete interface, a single function, or even a set of APIs. The service layer (513) provides software services to the computer (502) or other components (whether or not illustrated) that are communicably coupled to the computer (502). The functionality of the computer (502) may be accessible for all service consumers using this service layer.

Software services, such as those provided by the service layer (513), provide reusable, defined business functionalities through a defined interface. For example, the interface may be software written in JAVA, C++, or other suitable language providing data in extensible markup language (XML) format or other suitable format. While illustrated as an integrated component of the computer (502), alternative implementations may illustrate the API (512) or the service layer (513) as stand-alone components in relation to other components of the computer (502) or other components (whether or not illustrated) that are communicably coupled to the computer (502). Moreover, any or all parts of the API (512) or the service layer (513) may be implemented as child or sub-modules of another software module, enterprise application, or hardware module without departing from the scope of this disclosure.

The computer (502) includes an interface (504). Although illustrated as a single interface (504) in FIG. 5, two or more interfaces (504) may be used according to particular needs, desires, or particular implementations of the computer (502). The interface (504) is used by the computer (502) for communicating with other systems in a distributed environment that are connected to the network (530). Generally, the interface (504 includes logic encoded in software or hardware (or a combination of software and hardware) and operable to communicate with the network (530). More specifically, the interface (504) may include software supporting one or more communication protocols associated with communications such that the network (530) or interface's hardware is operable to communicate physical signals within and outside of the illustrated computer (502).

The computer (502) includes at least one computer processor (505) that executes the AI module (160) described above. Although illustrated as a single computer processor (505) in FIG. 5, two or more processors may be used according to particular needs, desires, or particular implementations of the computer (502). Generally, the computer processor (505) executes instructions and manipulates data to perform the operations of the computer (502) and any algorithms, methods, functions, processes, flows, and procedures as described in the instant disclosure.

The computer (502) also includes a memory (506) that holds data for the computer (502) or other components (or a combination of both) that can be connected to the network (530). For example, memory (506) can be a database storing data consistent with this disclosure. Although illustrated as a single memory (506) in FIG. 5, two or more memories may be used according to particular needs, desires, or particular implementations of the computer (502) and the described functionality. While memory (506) is illustrated as an integral component of the computer (502), in alternative implementations, memory (506) can be external to the computer (502).

Furthermore, memory (506) can be a computer-readable recording medium and may be composed of, for example, at least one of a ROM (Read Only Memory), an EPROM (Erasable Programmable ROM), an EEPROM (Electrically Erasable Programmable ROM), and a RAM (Random Access Memory). Memory (506) may be called a register, a cache, a main memory (main storage apparatus), or the like. Memory (506) can save a program (program code), a software module, and the like that can be executed to carry out the radio communication method according to an embodiment of the present invention.

The application (507) is an algorithmic software engine providing functionality according to particular needs, desires, or particular implementations of the computer (502), particularly with respect to functionality described in this disclosure. For example, application (507) can serve as one or more components, modules, applications, etc. Further, although illustrated as a single application (507), the application (507) may be implemented as multiple applications (507) on the computer (502). In addition, although illustrated as integral to the computer (502), in alternative implementations, the application (507) can be external to the computer (502).

There may be any number of computers (502) associated with, or external to, a computer system containing computer (502), wherein each computer (502) communicates over network (530). Further, the term "client," "user," and other appropriate terminology may be used interchangeably as appropriate without departing from the scope of this disclosure. Moreover, this disclosure contemplates that many users may use one computer (502), or that one user may use multiple computers (502).

The AI module described in embodiments above develops a specific equation for the given field, not a general one known in the art. Further, the AI module ensures only efficient drilling parameters are captured through the use of MSE & UCS. Moreover, embodiments disclosed herein allow for optimizing any non-efficient drilling with a click of a button, then calibrate the actual data with the predicted one.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed is:

1. A method for automatic optimization of rate of penetration (ROP), the method comprising:
    obtaining, by a computer processor, a plurality of drilling surface parameters for a field of interest;
    identifying, by a computer processor, an undefined compressive strength (UCS) data for a targeted formation of interest based on well logs;
    calculating, by a computer processor, a mechanical specific energy (MSE) data based on the identified UCS data for the targeted formation of interest;
    filtering, by a computer processor, the calculated MSE data based on the identified UCS data with a range for the targeted formation of interest;
    training, by a computer processor, a machine learning model using the drilling surface parameters as inputs;

outputting, by a computer processor, a plurality of weights for drilling parameters in a ROP equation derived by using the trained machine learning model for the field of interest, wherein the drilling surface parameters are used as inputs;

determining, by a computer processor, a plurality of weights for drilling parameters in a Teale's MSE equation for the field of interest, wherein the drilling surface parameters are used as inputs;

outputting, by a computer processor, a plurality of weights for drilling parameters in the Teale's MSE equation for the field of interest, wherein the drilling surface parameters are used as inputs;

combining, by a computer processor, the machine learning ROP equation with the Teale's MSE equation to form a set of two equations;

determining, by a computer processor, a plurality of optimum drilling parameters by simultaneously solving the set of machine learning ROP equation and the Teale's MSE equation;

generating, by a computer processor, a work order to adjust the drilling parameters based on the determined optimum drilling parameters and previous drilling parameters; and causing, by a computer processor, display of the work order and the determined optimum drilling parameters in a user interface of a client device.

2. The method of claim 1,
wherein the drilling surface parameter is one selected from a group consisting of an UCS data, a MSE data, a torque data, a revolutions per minute (RPM) data, a weight on bit (WOB) data, a pumping rate (GPM) data, and a stand pipe pressure (SPP) data.

3. The method of claim 1:
wherein the machine learning algorithm is one selected from a group consisting of a linear regression algorithm, a logistic regression algorithm, a support vector regression algorithm, a random forest algorithm, a boosted decision tree algorithm, a multi-layer perceptron algorithm, and a convolutional neural network.

4. The method of claim 1,
wherein the outputted weight in the machine learning ROP equation is a value for a drilling surface parameter selected from a group consisting of UCS, MSE, torque, RPM, WOB, GPM, and SPP.

5. The method of claim 1,
wherein the outputted model weights in the MSE equation is a value for a drilling surface parameter selected from a group consisting of UCS, MSE, torque, RPM, WOB, GPM, and SPP.

6. The method of claim 1, further comprising:
maintaining, by a computer processor, an optimum drilling ROP curve and an optimum MSE during downhole application for the field of interest; and determining, by a computer processor, a pair of optimum drilling parameters by adjusting the targeted drilling parameters.

7. The method of claim 6:
wherein the determined optimum drilling parameter are torque and WOB; and wherein the targeted drilling surface parameters are MSE, RPM, WOB, GPM, and SPP.

8. The method of claim 6, further comprising:
determining, by a computer processor, a correlation coefficient between the predicted ROP curve and the actual ROP curve for the field of interest;

determining, by a computer processor, an "efficiency" type if the obtained optimum MSE value is within the targeted efficient MSE range and the correlation coefficient between the predicted ROP curve and/or the actual ROP curve is above a threshold; and determining, by a computer processor, an "inefficiency" type if the obtained optimum MSE is outside the targeted efficient MSE range and the correlation coefficient between the predicted ROP curve and/or the actual ROP curve is below a threshold.

9. The method of claim 8, further comprising:
wherein the correlation coefficient is one selected from a group consisting of a Pearson correlation coefficient, an intra-class correlation coefficient, a rank correlation coefficient, and a polychoric correlation coefficient.

10. The method of claim 8, further comprising:
determining, by a computer processor, new optimum drilling parameters based on updated targeted drilling surface parameters.

11. The method of claim 1:
wherein the machine learning model determines the weights for a plurality of drilling parameters in the ROP equation using an offset well data for the field of interest.

12. The method of claim 1, further comprising:
determining well path through the subterranean region of interest using the optimum drilling parameters; and
performing the well path using a drilling system.

13. The method of claim 1:
wherein the UCS data is determined based on actual well logs with a range for the targeted formation of interest, and
wherein the MSE data is determined from the UCS data for the targeted formation of interest.

14. A system for automatic optimization of ROP, the system comprising:
an AI module comprising a plurality of machine learning algorithms and a processor configured to execute instructions stored in a non-transitory computer storage medium for performing a method for optimizing ROP comprising:

obtaining, a plurality of drilling surface parameters for the field of interest;

identifying, an UCS data for a targeted formation of interest based on well logs;

calculating, a MSE data based on the identified UCS values for the targeted formation of interest;

filtering, the calculated MSE data based on the identified UCS data with a range for the targeted formation of interest;

training, a machine learning model using the drilling surface parameters as inputs;

outputting, a plurality of weights for drilling parameters in a ROP equation derived by using the trained machine learning model for the field of interest, wherein the drilling surface parameters are used as inputs;

determining, a plurality of weights for drilling parameters in a Teale's MSE equation for the field of interest, wherein the drilling surface parameters are used as inputs;

outputting, a plurality of weights for drilling parameters in the Teale's MSE equation for the field of interest, wherein the drilling surface parameters are used as inputs;

combining, the machine learning ROP equation with the Teale's MSE equation to form a set of two equations;

determining, a plurality of optimum drilling parameters by simultaneously solving the set of machine learning ROP equation and the Teale's MSE equation;

generating, a work order to adjust the drilling parameters based on the determined optimum drilling parameters and previous drilling parameters; and causing, display of the work order and the determined optimum drilling parameters in a user interface of a client device.

15. The system of claim 14:

wherein the machine learning algorithm is one selected from a group consisting of a linear regression algorithm, a logistic regression algorithm, a support vector regression algorithm, a random forest algorithm, a boosted decision tree algorithm, a multi-layer perceptron algorithm, and a convolutional neural network.

16. The system of claim 14, further comprising:

maintaining an optimum drilling ROP curve and an optimum MSE during downhole application for the field of interest; and determining a pair of optimum drilling parameters by adjusting the targeted drilling parameters.

17. The system of claim 16:

wherein the determined optimum drilling parameters are torque and WOB; and wherein the targeted drilling surface parameters are MSE, RPM, WOB, GPM, and SPP.

18. The system of claim 16, further comprising:

determining a correlation coefficient between the predicted ROP curve and the actual ROP curve for the field of interest;

determining an "efficiency" type if the obtained optimum MSE value is within the targeted efficient MSE range and the correlation coefficient between the predicted ROP curve and/or the actual ROP curve is above a threshold; and determining an "inefficiency" type if the obtained optimum MSE is outside the targeted efficient MSE range and the correlation coefficient between the predicted ROP curve and/or the actual ROP curve is below a threshold.

19. The system of claim 18:

wherein the correlation coefficient is one selected from a group consisting of: a Pearson correlation coefficient, an intra-class correlation coefficient, a rank correlation coefficient, and a polychoric correlation coefficient.

20. The system of claim 14, further comprising:

determining, new optimum drilling parameters based on updated targeted drilling surface parameters.

* * * * *